United States Patent
Lai et al.

(10) Patent No.: US 7,892,709 B2
(45) Date of Patent: Feb. 22, 2011

(54) COLOR FILTER SUBSTRATE AND FABRICATING METHOD THEREOF

(75) Inventors: Chi-Kuang Lai, Hsinchu (TW); Ju-Yu Lee, Hsinchu (TW); An-Hsu Lu, Hsinchu (TW); Shu-Ching Hsu, Hsinchu (TW); Lu-Kuen Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1096 days.

(21) Appl. No.: 11/610,510

(22) Filed: Dec. 14, 2006

(65) Prior Publication Data
US 2008/0032215 A1 Feb. 7, 2008

(30) Foreign Application Priority Data
Aug. 3, 2006 (TW) ............... 95128459 A

(51) Int. Cl.
*G02B 5/20* (2006.01)
(52) U.S. Cl. ......................................................... 430/7
(58) Field of Classification Search ........................ None
See application file for complete search history.

(56) References Cited

U.S. PATENT DOCUMENTS

| | | | |
|---|---|---|---|
| 6,208,394 B1 | 3/2001 | Tanaka et al. | |
| 6,392,728 B2 | 5/2002 | Tanaka et al. | |
| 2001/0000437 A1 | 4/2001 | Tanaka et al. | |
| 2007/0064188 A1* | 3/2007 | Okamoto | 349/135 |

FOREIGN PATENT DOCUMENTS

| | | | |
|---|---|---|---|
| JP | 04333824 | | 11/1992 |
| JP | 06095100 | | 4/1994 |
| JP | 08-220528 | | 8/1996 |
| JP | 08327814 | | 12/1996 |
| JP | 9-211441 A | * | 8/1997 |
| JP | 10-333135 A | * | 12/1998 |
| JP | 2002-207116 | | 7/2002 |

OTHER PUBLICATIONS

Computer-generated translation of JP 9-211441 (Aug. 1997).*
Computer-generated translation of JP 10-333135 (Dec. 1998).*
Computer-generated translation of JP 2002-207116 (Jul. 2002).*

* cited by examiner

*Primary Examiner*—John A. McPherson
(74) *Attorney, Agent, or Firm*—Jianq Chyun IP Office

(57) ABSTRACT

A method of fabricating a color filter substrate is provided. First, a transparent substrate having a display region, a peripheral region and a buffer region is provided. Next, a shielding pattern layer is formed in the peripheral region of the transparent substrate, and a color filter layer is formed in the display region of the transparent substrate. Further, at least one buffer pattern is formed in the buffer region.

18 Claims, 16 Drawing Sheets

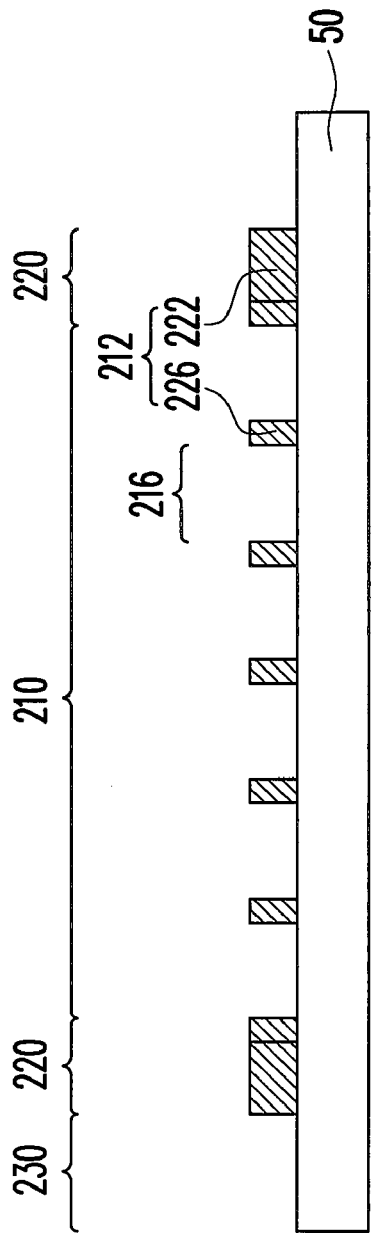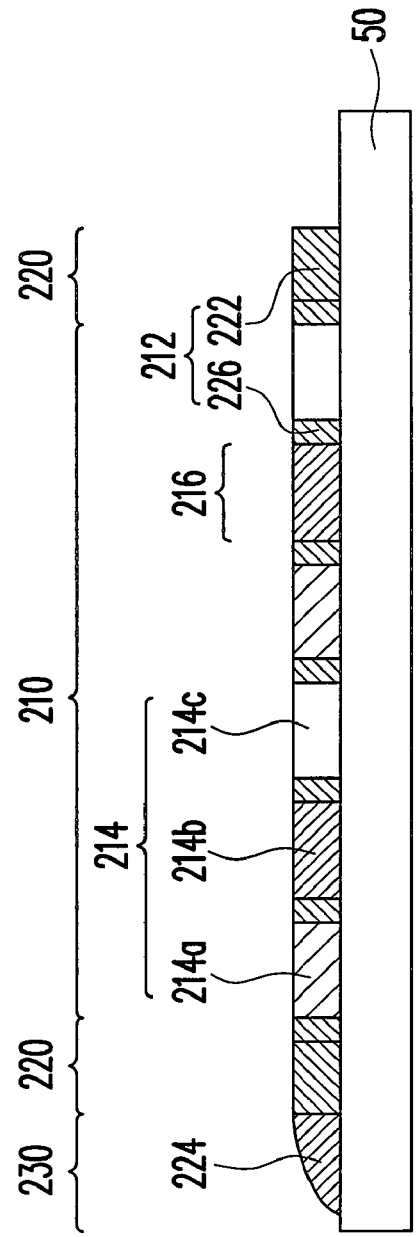

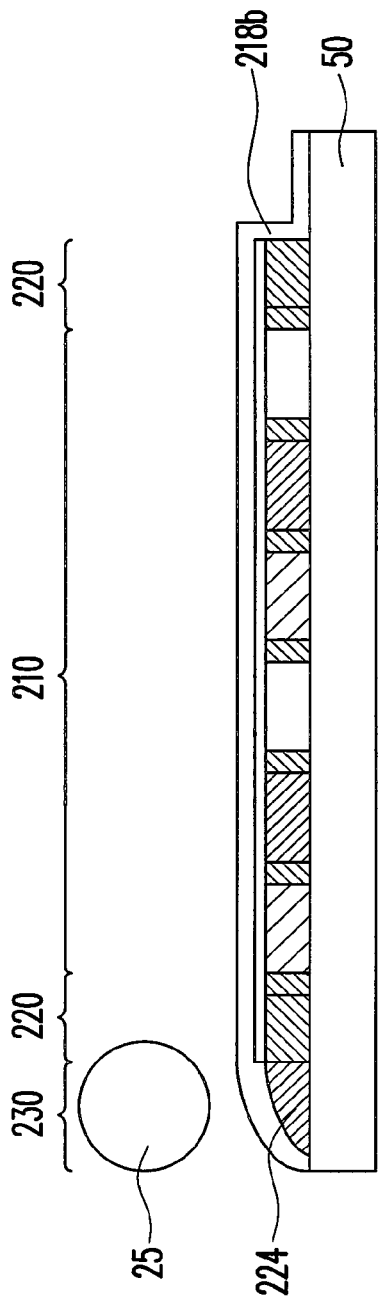
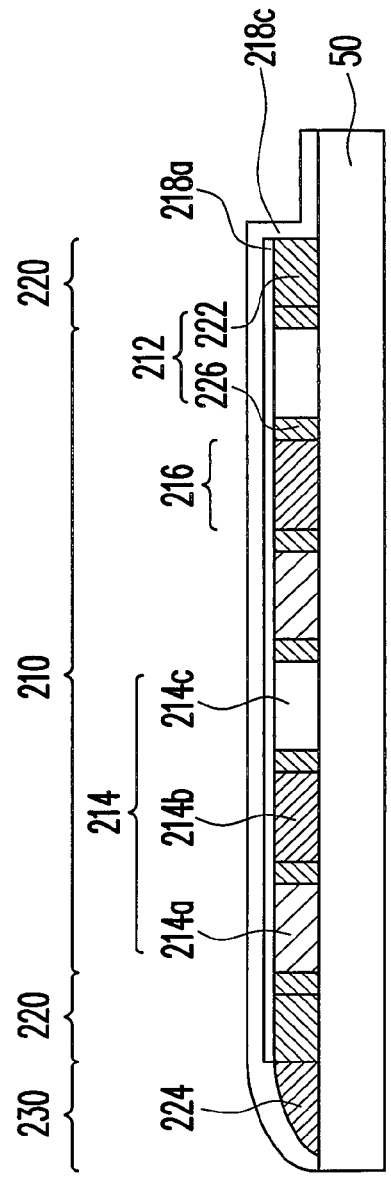

COLOR FILTER SUBSTRATE AND FABRICATING METHOD THEREOF

CROSS-REFERENCE TO RELATED APPLICATION

This application claims the priority benefit of Taiwan application serial no. 95128459, filed Aug. 3, 2006. All disclosure of the Taiwan application is incorporated herein by reference.

BACKGROUND OF THE INVENTION

1. Field of Invention

The present invention relates to a color filter substrate and a fabricating method thereof. More particularly, the present invention relates to a color filter substrate capable of avoiding the defect of alignment material layer caused by a rubbing process and a fabricating method thereof.

2. Description of Related Art

As the computer capability, Internet and multimedia technology performance are highly developed, image information has been gradually converted from analog information to digital information. In order to fit the modem life style, the weight and size of many electronic devices have become light and thin. For example, display devices characterized by being thin and light, planar image frame, no radiation, and low power consumption have become the main stream displays replacing those with Cathode Ray Tube (CRT) which have big volume, high radiation, heavy weight and high power consumption. Among Liquid Crystal Displays (LCD), Organic Electro-luminescence Displays (OELD), and Plasma Display Panels (PDP), the development of LCDs is especially mature.

Currently, the LCDs are developed towards full color, big size, high resolution and low cost, wherein LCDs usually achieve the effect of colorization display by the use of the color filter substrate. FIGS. 1A to 1E are schematic cross-sectional views of the processes of the conventional method of fabricating the color filter substrate. Referring to FIG. 1, a transparent substrate 50 having a display region 110 and a peripheral region 120 is first provided, in which the peripheral region 120 is disposed around the display region 110. Then, a shielding pattern layer 112 is formed in the peripheral region 120 and the display region 110 on the transparent substrate 50. The shielding pattern layer 112 defines a plurality of sub pixel regions 116 in the display region 110 on the transparent substrate 50, and the shielding pattern layer 112 on the peripheral region 120 on the transparent substrate 50 forms a shielding frame 122. The material of the shielding pattern layer 112 is black resin.

Referring to FIG. 1B, red filter patterns 114a, green filter patterns 114b, and blue filter patterns 114c are formed in the sub pixel regions 116, thus constituting a color filter layer 114.

Referring FIG. 1C, a common electrode layer 118a is formed over the transparent substrate 50. Then, referring to FIG. 1D, an alignment material layer 118b is formed over the transparent substrate 50, covering the shielding pattern layer 112, the color filter layer 114 and the common electrode layer 118a.

Referring to FIG. 1E, an alignment rubbing process is performed to the alignment material layer 118b. Generally, the alignment rubbing process is a process using a rubbing roller 25 to rub from one side edge of the peripheral region 120 on the transparent substrate 50. However, the edge has an obvious change of height due to the thickness of the shielding frame 122. When the rubbing roller 25 starts rubbing from the side edge of the shielding frame 122 of the peripheral region 120 on the transparent substrate 50, the existing height may easily result in trace or damage to the surface of the rubbing roller 25. As such, when performing the alignment rubbing process on the alignment material layer 118b, the damaged rubbing roller 25 causes abnormal recesses or groove marks on the alignment material layer 118b. Thus, the LCD panel using the color filter substrate may have the defect of poor liquid crystal molecule alignment, thereby leading to poor display quality of the LCD panel.

SUMMARY OF THE INVENTION

An objective of the present invention is to provide a method of fabricating a color filter substrate, for solving the problem existing in the conventional art that the rubbing roller is easily damaged in the alignment rubbing process, which further damages the alignment material layer.

Another objective of the present invention is to provide a color filter substrate with a particular design of the peripheral region, so as to solve the problem that the alignment material layer is damaged in the alignment rubbing process.

In order to achieve the above or other objectives, the present invention provides a method of fabricating a color filter substrate. Firstly, a transparent substrate having a display region, a peripheral region and a buffer region is provided. Then, a shielding pattern layer is formed in the display region and the peripheral region on the transparent substrate, and a color filter layer is formed in the display region on the transparent substrate. Further, at least one buffer pattern is formed in the buffer region.

In an embodiment of the present invention, the method further comprises forming an alignment material layer so as to at least cover a part of the color filter layer and shielding pattern layer. Then, an alignment rubbing process is performed to the alignment material layer from the buffer pattern.

In an embodiment of the present invention, the material of the buffer pattern is selected from one of black resin, red resin, green resin, blue resin, transparent resin and the combination thereof.

In an embodiment of the present invention, the buffer pattern comprises a plurality of patterns, and the arrangement density of the patterns is gradually reduced from the shielding pattern layer to the position away from the shielding pattern layer.

In an embodiment of the present invention, the material of the buffer pattern is the same as the material of the shielding pattern layer, and the buffer pattern comprises a plurality of patterns arranged on the edge of the shielding pattern layer.

In an embodiment of the present invention, the height of the buffer pattern is larger than or equal to the height of the shielding pattern layer. According to an embodiment of the present invention, the height of the buffer pattern is larger than the height of the shielding pattern layer by 1-2 μm. Moreover, the buffer pattern and the shielding pattern layer are not connected together, or the edge of the buffer pattern and the edge of the shielding pattern layer are connected together, or the buffer pattern covers a part of the shielding pattern layer.

In an embodiment of the present invention, the buffer region is disposed on one side edge of the peripheral region, two side edges of the peripheral region, or around the peripheral region.

In an embodiment of the present invention, the color filter layer is formed before or after the shielding pattern layer is formed.

In an embodiment of the present invention, the method of the present invention further comprises forming a planarization layer to cover the shielding pattern layer and the color filter layer.

In order to achieve the above or other objectives, the present invention provides a color filter substrate, which comprises a transparent substrate, a shielding pattern layer, a color filter layer and at least one buffer pattern. The transparent substrate has a display region, a peripheral region, and a buffer region. The shielding pattern layer is at least disposed in the peripheral region on the transparent substrate, and the color filter layer is disposed in the display region. The buffer pattern is disposed in the buffer region.

In an embodiment of the present invention, the color filter substrate further comprises an alignment material layer at least covering a part of the color filter layer and shielding pattern layer.

In an embodiment of the present invention, the material of the buffer pattern is selected from one of black resin, red resin, green resin, blue resin, transparent resin, and the combination thereof.

In an embodiment of the present invention, the buffer pattern comprises a plurality of patterns, and the arrangement density of the patterns is gradually reduced from the shielding pattern layer to the position away from the shielding pattern layer.

In an embodiment of the present invention, the material of the buffer pattern is the same as the material of the shielding pattern layer, and the buffer pattern comprises a plurality of patterns arranged on the edge of the shielding pattern layer.

In an embodiment of the present invention, the height of the buffer pattern is larger than or equal to the height of the shielding pattern layer. According to an embodiment of the present invention, the height of the buffer pattern is larger than the height of the shielding pattern layer by 1-2 μm. Moreover, the buffer pattern and the shielding pattern layer are not connected together, or the edge of the buffer pattern and the edge of the shielding pattern layer are connected together, or the buffer pattern covers a part of the shielding pattern layer.

In an embodiment of the present invention, the buffer region is disposed on one side edge of the peripheral region, two side edges of the peripheral region, or around the peripheral region.

In the method of fabricating the color filter substrate of the present invention, a buffer pattern is formed on one side edge, two side edges or around the peripheral region of the color filter substrate, so as to avoid trace or damage to the surface of the rubbing roller in the alignment rubbing process, which further results in the defect of the alignment material layer.

In order to the make aforementioned and other objects, features and advantages of the present invention comprehensible, preferred embodiments accompanied with figures are described in detail below.

BRIEF DESCRIPTION OF THE DRAWINGS

FIGS. 2A to 2F are schematic cross-sectional views of the processes of a method of fabricating the color filter substrate according to a preferred embodiment of the present invention.

DESCRIPTION OF EMBODIMENTS

The First Embodiment

Figure 1A:
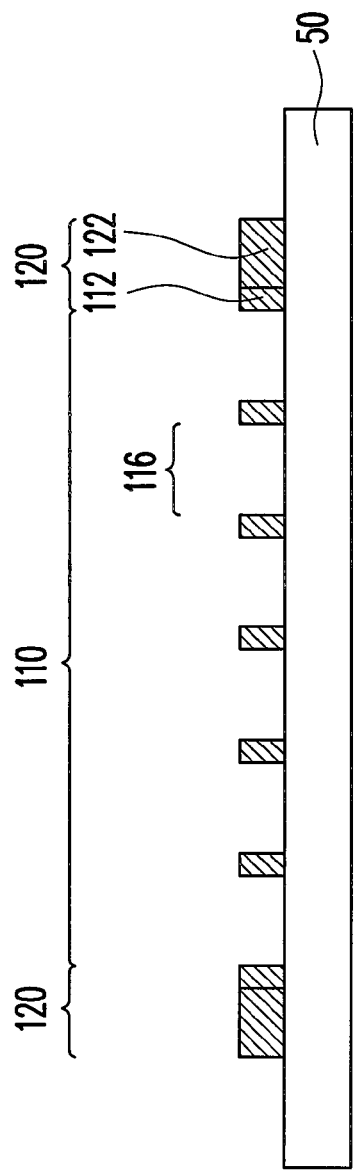
FIGS. 1A to 1E are schematic cross-sectional views of the processes of the conventional method of fabricating the color filter substrate.
Figure 1B:
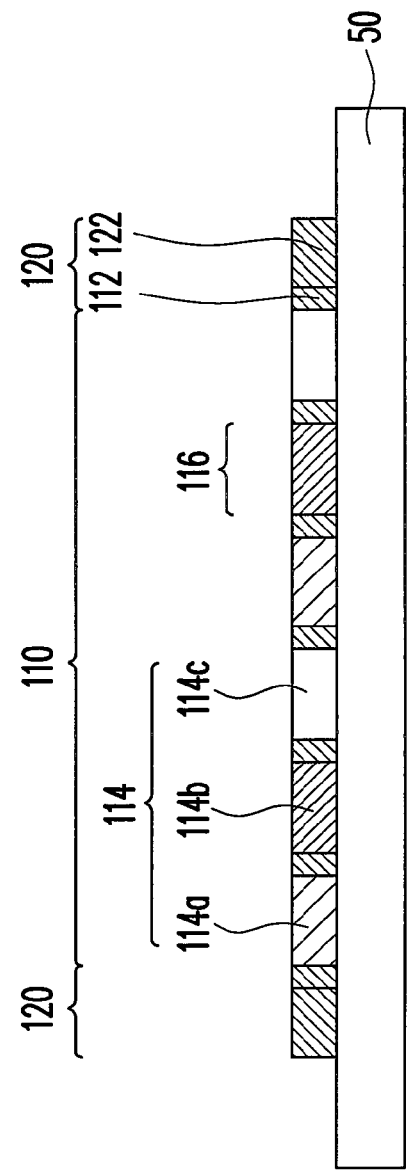
Figure 1C:
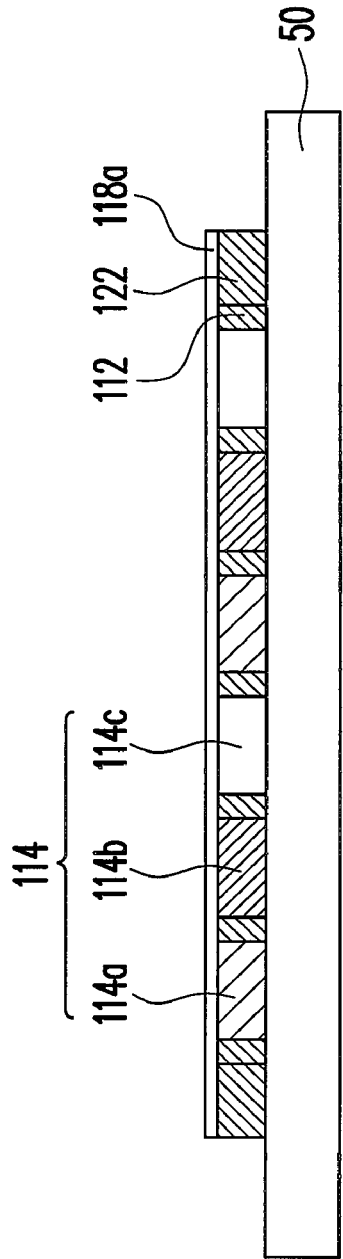
Figure 1D:
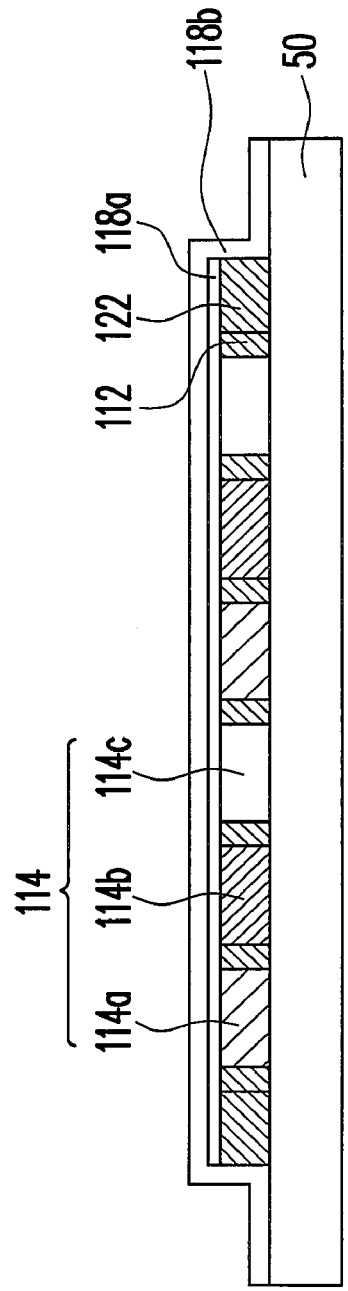
Figure 1E:
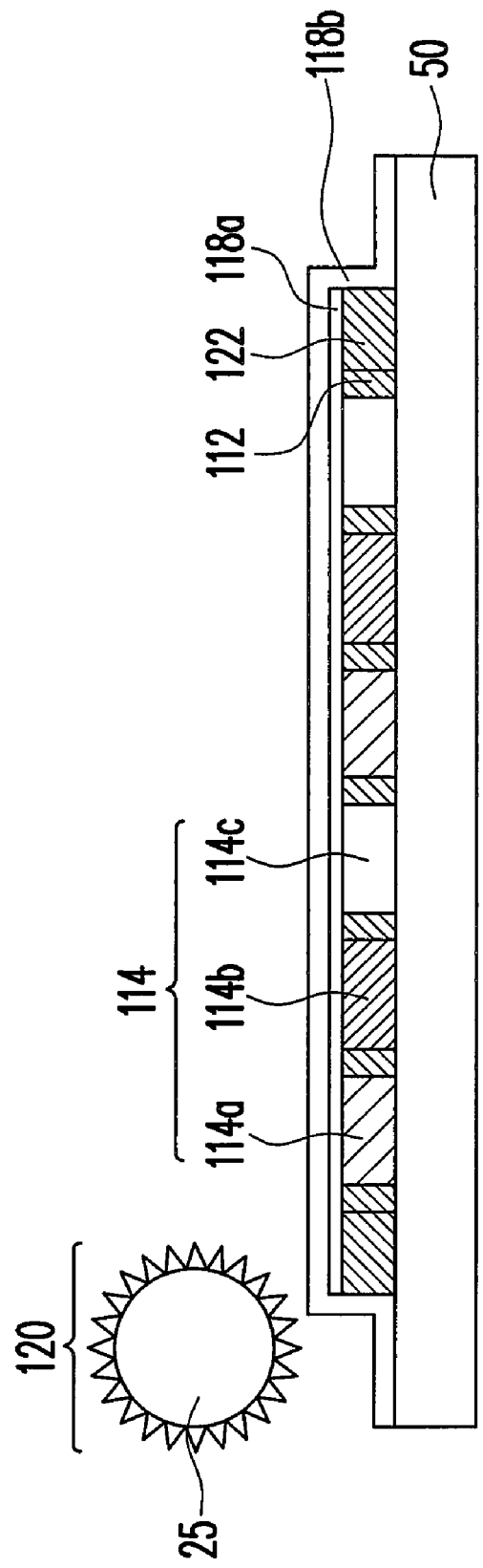
Figure 2C:
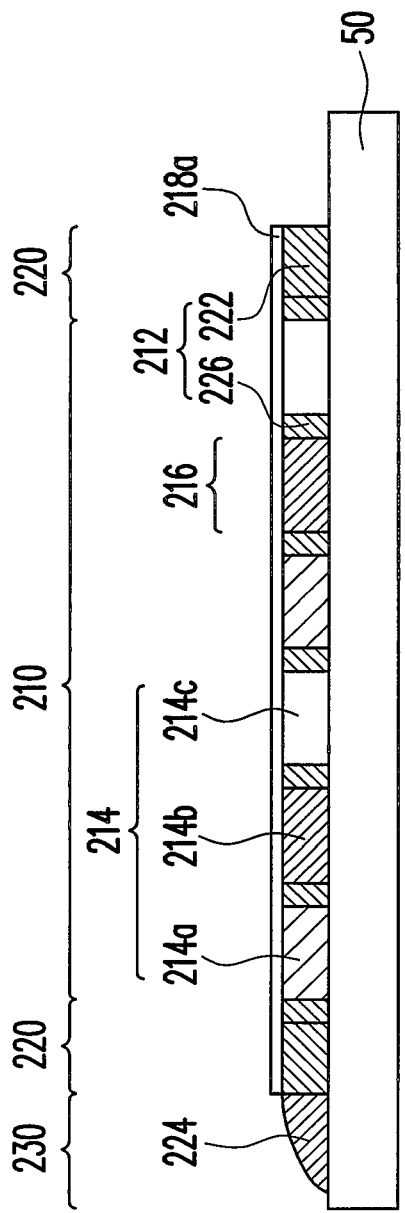
Figure 2D:
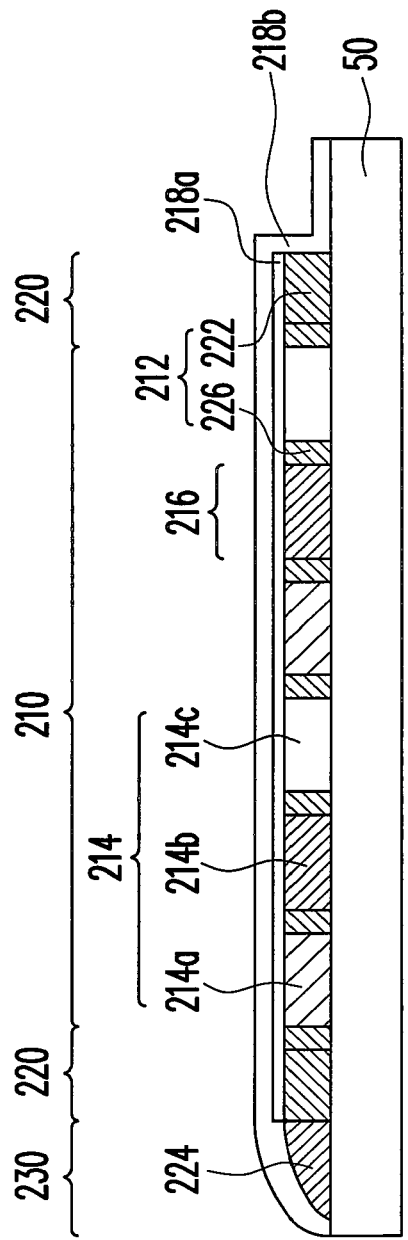

FIGS. 2A to 2F are schematic cross-sectional views of the processes of a method of fabricating the color filter substrate according to a preferred embodiment of the present invention. Referring to FIG. 2A, a transparent substrate 50 having a display region 210, a peripheral region 220 and a buffer region 230 is first provided, in which the peripheral region 220 is disposed around the display region 210. Next, a shielding pattern layer 212 is formed in the peripheral region 220 on the transparent substrate 50. In an embodiment, the shielding pattern layer 212 is further formed in the display region 210, and the shielding pattern layer 212 formed in the display region defines a plurality of sub pixel regions 216 in the display region 210 of the transparent substrate 50, so the shielding pattern layer disposed in the display region is also called a shielding black matrix 226. The shielding pattern layer 212 formed in the peripheral region 220 on the transparent substrate 50 surrounds the display region 210, thus forming the structure of a shielding frame 222. The method of forming the shielding pattern layer 212 involves, for example, forming a shielding material layer (not shown), and exposing the shielding material layer by the use of a mask, and then performing the development. The thickness of the shielding pattern layer 212 is about 1.0 to 1.5 μm, and the material is, for example, black resin.

Then, referring to FIG. 2B, a color filter layer 214 is formed in each of the sub pixel regions 216 in the display region 210 on the transparent substrate 50. The color filter layer 214, for example, comprises at least one red filter pattern 214a (e.g. red resin), at least one green filter pattern 214b (e.g. green resin), and at least one blue filter pattern 214c (e.g. blue resin).

Referring to FIG. 2B, when the color filter layer 214 is formed in the sub pixel regions 216 in the display region 210 on the transparent substrate 50, the buffer pattern 224 is formed in the buffer region 230 of the edge of the shielding frame 222 disposed at one side edge of the peripheral region 220 on the transparent substrate 50. The material of the buffer pattern 224 can be the same as the material of one of the red filter pattern 214a, the green filter pattern 214b and the blue filter pattern 214c, and preferably is the same as the material of the blue filter pattern 214c. According to another preferred embodiment of the present invention, after the color filter layer 214 and the shielding pattern layer 212 are formed, the method further comprises forming a spacer (not shown), which can be used to support the cell gap between the color filter substrate and the active element substrate when the liquid crystal panel is subsequently assembled.

Next, referring to FIG. 2C, a common electrode layer 218a is formed over the transparent substrate 50 to cover the shielding pattern layer 212, the shielding frame 222 and the color filter layer 214. According another embodiment, after forming the structure shown in FIG. 2C, referring to FIG. 2D, an alignment material layer 218b is formed over the transparent substrate 50 to cover the common electrode layer 218a.

Then, referring to FIG. 2E, an alignment rubbing process is performed on the alignment material layer 218b. In the alignment rubbing process, for example, a rubbing roller 25 is used to perform the alignment rubbing process to the alignment material layer 218b from one side edge having the buffer pattern 224 in the buffer region 230 on the transparent substrate 50. Here, since the buffer pattern 224 is formed on the edge of the shielding frame 222, the height fall of the position is reduced. Therefore, when the rubbing roller 25 starts rubbing from the position, the rubbing roller 25 is not damaged, so as to assure that the alignment material layer 218b is not damaged to have defect when the rubbing roller 25 performs the alignment treatment.

After the alignment rubbing process, an alignment layer 218c which goes through the alignment process is formed, as shown in FIG. 2F, and thus the fabricating of the color filter substrate is completed.

Figure 3:
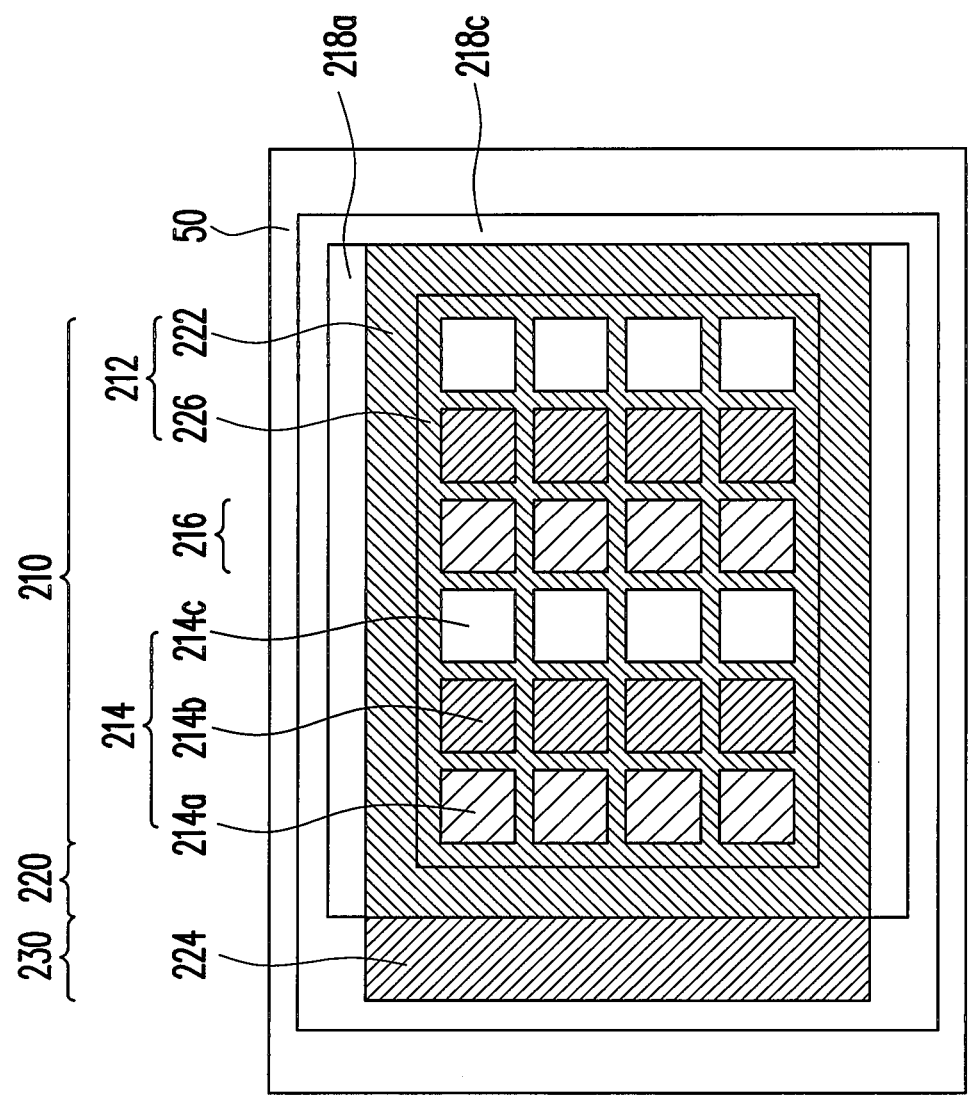
FIG. 3 is a schematic top view of FIG. 2F.

Therefore, the color filter substrate fabricated by the method is as shown in FIG. 2F and FIG. 3, wherein FIG. 3 is a top view of FIG. 2F. The color filter substrate comprises a transparent substrate 50, a shielding pattern layer 212 (including a shielding black matrix 226 and a shielding frame 222), a color filter layer 214, a buffer pattern 224, and an alignment material layer 218c. The transparent substrate 50 has a display region 210, a peripheral region 220, and a buffer region 230. The shielding pattern layer 212 is disposed in the peripheral region 220 on the transparent substrate 50. The shielding pattern layer 212 is further formed in the display region 210, and the shielding pattern layer 212 disposed in the display region 210 is a shielding black matrix 226 to define a plurality of sub pixel regions 216 on the substrate. The shielding pattern layer 212 disposed in the peripheral region 220 of the transparent substrate 50 surrounding the display region forms a shielding frame 222. The color filter layer 214 is disposed in the sub pixel regions 216. The buffer pattern 224 is disposed on the edge of the shielding frame 222 on at least one side edge of the peripheral region 220. The alignment layer 218c at least covers a part of the color filter layer 214, the shielding pattern layer 212 and the buffer pattern 224.

In a preferred embodiment, a common electrode layer 218a is further disposed under the alignment layer 218c, and the common electrode layer 218a covers the color filter layer 214 and the shielding pattern layer 212.

Figure 4A:
FIG. 4A is a scanning electronic microscopic (SEM) picture of the shielding frame of the conventional color filter substrate.
Figure 4B:
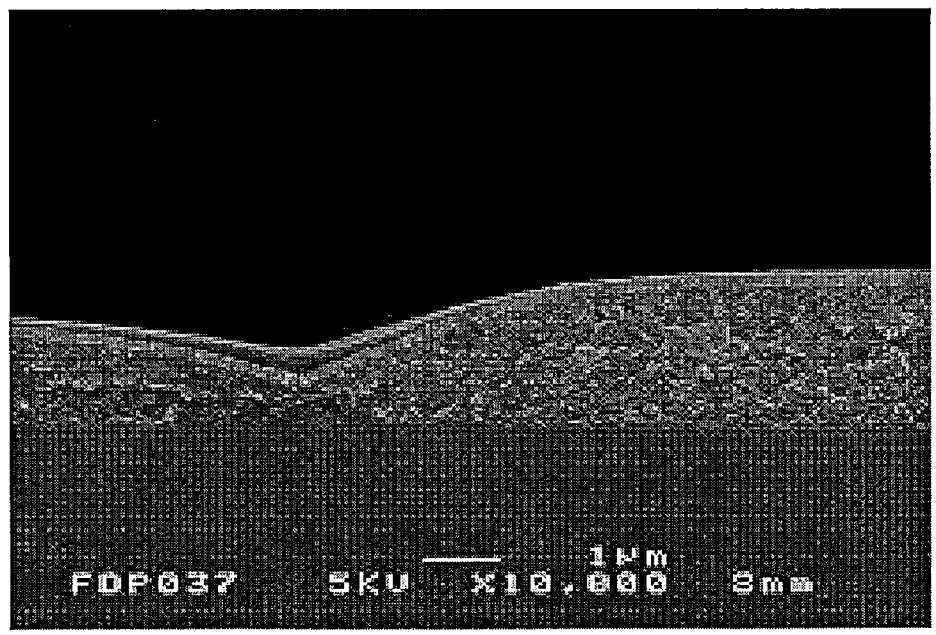
FIG. 4B is an SEM picture of the shielding frame of the color filter substrate of the present invention.

FIG. 4A is a scanning electronic microscopic (SEM) picture of the shielding frame of the conventional color filter substrate, and FIG. 4B is a SEM picture of the shielding frame of the color filter substrate of the present invention. It can be seen from FIG. 4A that the side edge of the shielding frame of the conventional color filter substrate has obvious height fall. However, it can be seen from FIG. 4B that if the material (e.g. red, green, or blue filter material) of the color filter layer is used to form the buffer pattern on the edge of the shielding frame, the height fall at the position is obviously reduced.

Figure 5A:
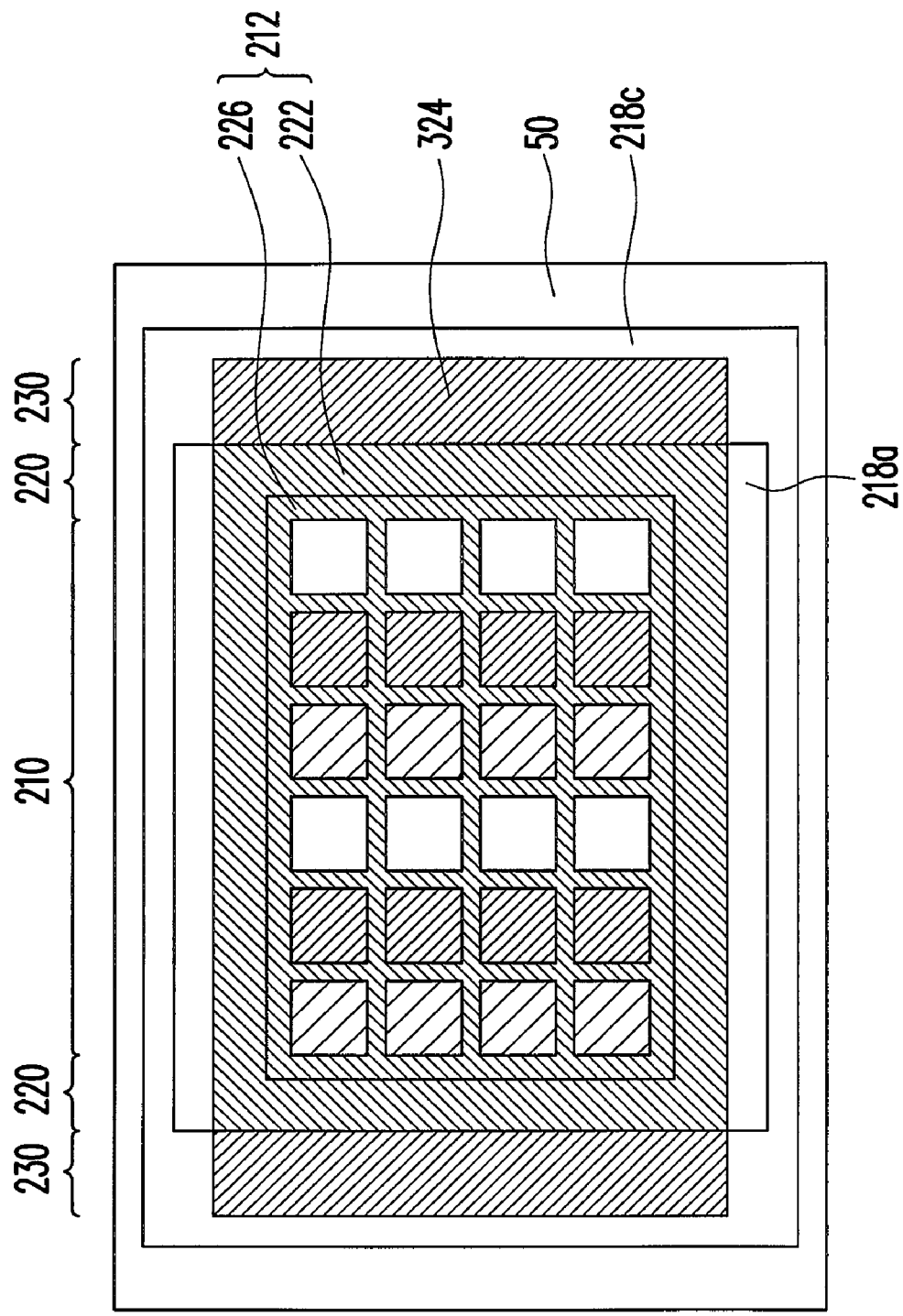
FIG. 5A is a schematic top view of another color filter substrate of the embodiment of the present invention.
Figure 5B:
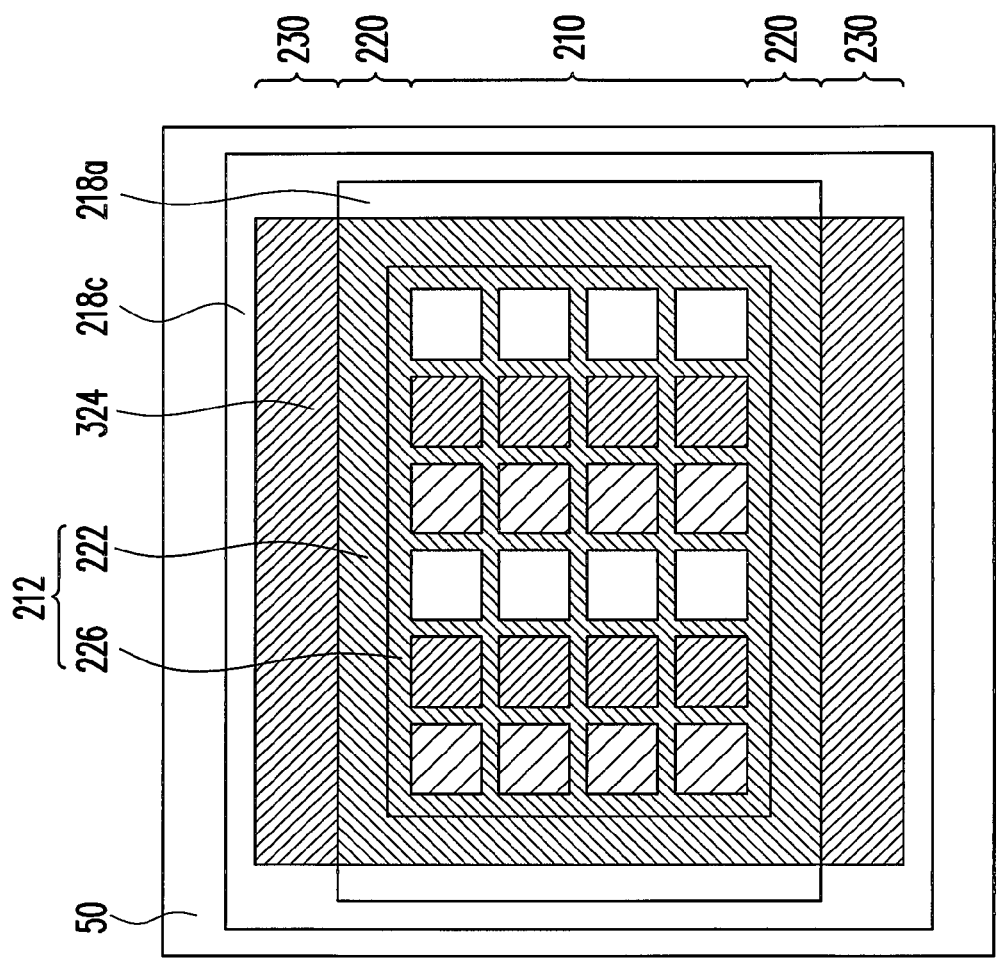
FIG. 5B is a schematic top view of another color filter substrate of the embodiment of the present invention.

In the present embodiment, the buffer pattern 224 is formed on the edge of the shielding frame 222 at one side edge of the peripheral region 220 (as shown in FIG. 3). Furthermore, in another embodiments, a buffer pattern 324 can be formed on the edge of the shielding frame 222 at opposite two side edges of the peripheral region 220, as shown in FIG. 5A and FIG. 5B. When it is intended to perform the alignment rubbing process, the alignment rubbing process can start from any position where the buffer pattern 324 is formed.

Figure 6:
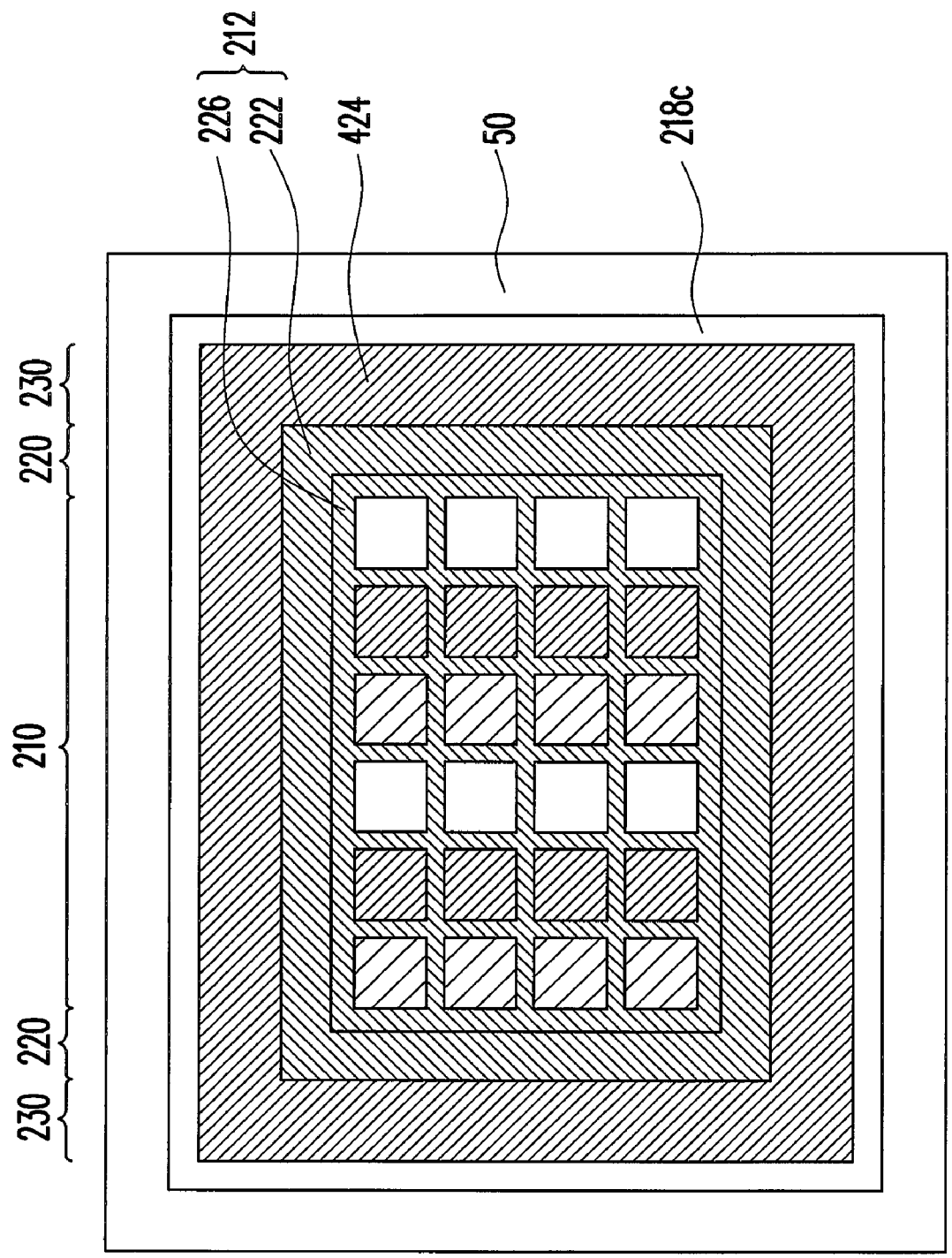
FIG. 6 is a schematic top view of still another color filter substrate of the embodiment of the present invention.

In another embodiment, the present invention can has a buffer pattern 424 formed on the edge of the shielding frame 222 around the peripheral region 220, as shown in FIG. 6. That is, the buffer pattern 424 is formed on the edge of the entire shielding frame 222. Similarly, when it is intended to perform the alignment rubbing process, the alignment rubbing process can start from any position where the buffer pattern 424 is formed.

Figure 7A:
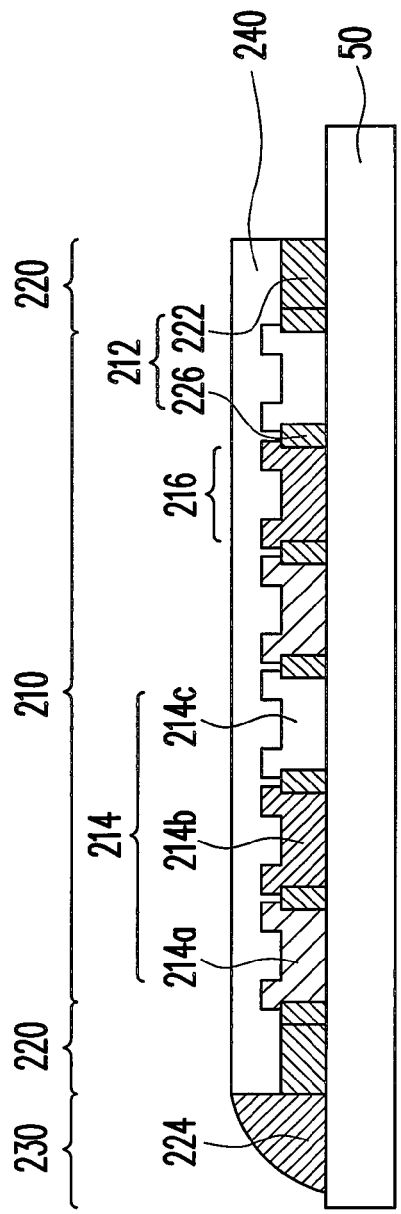
FIG. 7A is a schematic cross-sectional view of the processes of a method of fabricating the color filter substrate of the embodiment of the present invention.
Figure 7B:
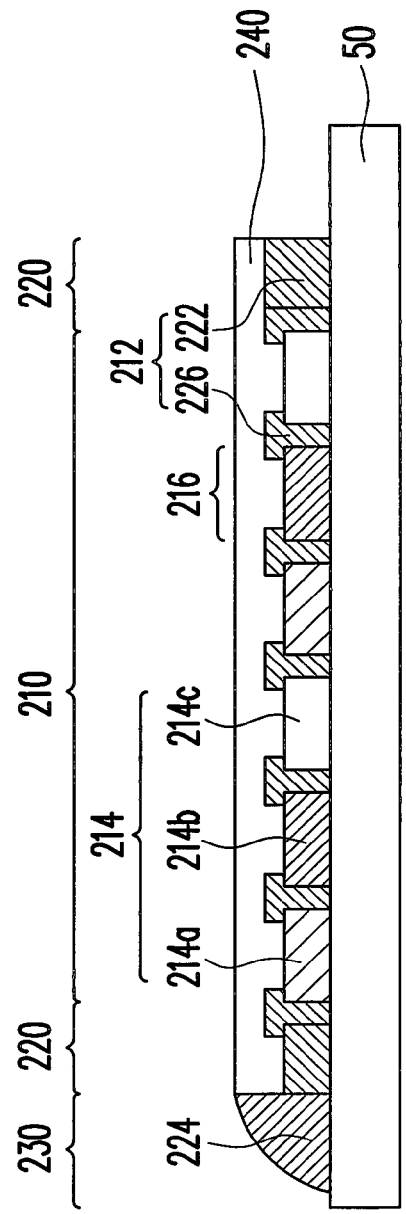
FIG. 7B is a schematic cross-sectional view of the processes of another method of fabricating the color filter substrate of the embodiment of the present invention.

In addition, the shielding pattern layer 212 can be first formed on the transparent substrate 50, and the color filter layer 214 is then formed. A planarization layer 240 can be further formed to cover the shielding pattern layer 212 and the color filter layer 214, as shown in FIG. 7A, which is not limited in the present invention. Therefore, the color filter layer 214 can also be first formed on the transparent substrate 50, and then the shielding pattern layer 212 is formed. Similarly, a planarization layer 240 can be further formed to cover the shielding pattern layer 212 and the color filter layer 214, as shown in FIG. 7B.

The Second Embodiment

In the present invention, the red filter pattern, the green filter pattern, or the blue filter pattern can be used as the material of the buffer pattern, and additionally the material that has the same material as the shielding pattern layer can also be used as the material of the buffer pattern. However, the design of the pattern is different from that of the first embodiment.

FIGS. 8A to 8E only show a part of the shielding frame 222 disposed in the peripheral region and the buffer patterns 224a, 224b, 224c, 224d, and 224e disposed in the buffer region. The film layers, such as the color filter layer, the shielding pattern layer, the electrode layer, and the alignment material layer in the display region are the same as those of the first embodiment (as shown in FIG. 3), and the details will not be described herein again.

Figure 8C:
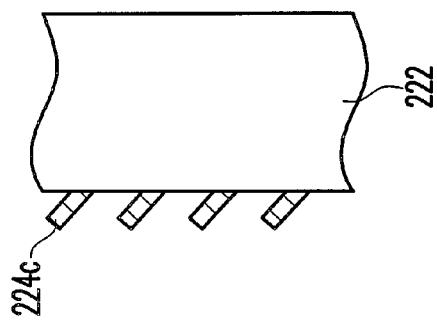
FIGS. 8A to 8E are schematic views of a part of the shielding pattern layer disposed in the peripheral region and the buffer pattern disposed in the buffer region in the color filter substrate of several embodiments of the present invention.
Figure 8B:
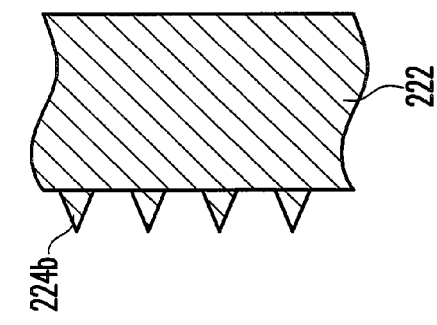
Figure 8E:
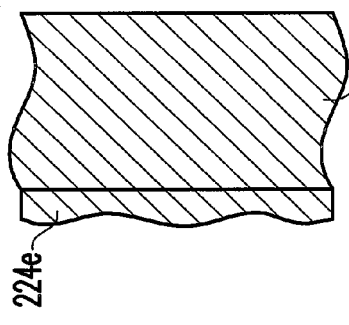
Figure 8A:
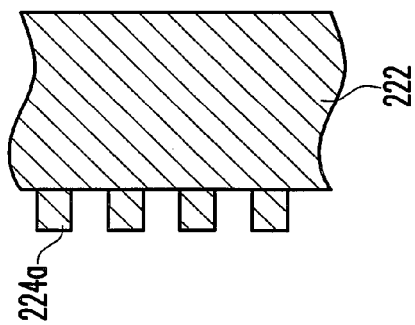

Referring to FIG. 8A, in the present embodiment, the buffer pattern comprises a plurality of patterns 224a arranged on the edge of the shielding frame 222. Since the buffer patterns 224a are constituted of many discontinuous patterns, the periphery of the edge of the shielding frame 222 becomes rough. As such, in the subsequent alignment rubbing process, compared with the direct contact between the rubbing roller and the shielding pattern layer, the contact area of the rubbing roller contacting the buffer patterns 224a is greatly reduced, so the probability of generating memory trace caused by the direct contact between the rubbing roller and the shielding pattern layer can be reduced, thereby raising the yield of the alignment process.

Figure 8D:
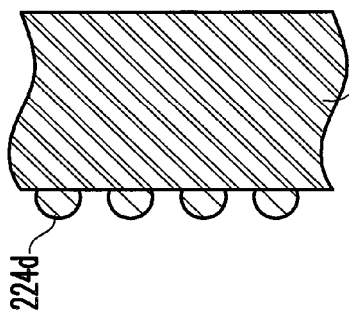

The buffer patterns 224a as shown in FIG. 8A are, for example, rectangular, but the shape of the alignment pattern is not limited in the present invention. The buffer patterns 224a can also be triangular buffer patterns 224b (as shown in FIG. 8B), strip-shaped buffer patterns 224c inclined by a certain angle (as shown in FIG. 8C), round or half-round buffer patterns 224d (as shown in FIG. 8D) or continuous irregular buffer patterns 224e (as shown in FIG. 8E).

No matter which shape the buffer pattern adopts, the buffer pattern of the present embodiment is defined while the shielding pattern layer 212 is defined. Therefore, the thickness of the buffer pattern and the thickness of the shielding pattern layer 212 are the same. Furthermore, the method of the present embodiment only needs to change the mask pattern of the shielding pattern layer, and thus the complexity of the process is not increased.

Similarly, the buffer pattern of the present embodiment can also be disposed on one side edge of the peripheral region (as shown in FIG. 3), two side edges of the peripheral region (as shown in FIG. 5A and FIG. 5B), or around the peripheral region (as shown in FIG. 6).

The Third Embodiment

The buffer pattern of the present invention can use the red filter pattern, the green filter pattern, the blue filter pattern, and the shielding pattern layer serving as the material of the buffer pattern, and can also use the transparent resin (i.e. the material of the spacer) serving as the material of the buffer pattern. Particularly, in the present embodiment, the buffer pattern comprises a plurality of patterns, and the arrangement density of the patterns is gradually reduced from the shielding pattern layer to the position away from the shielding pattern layer.

Figure 9B:
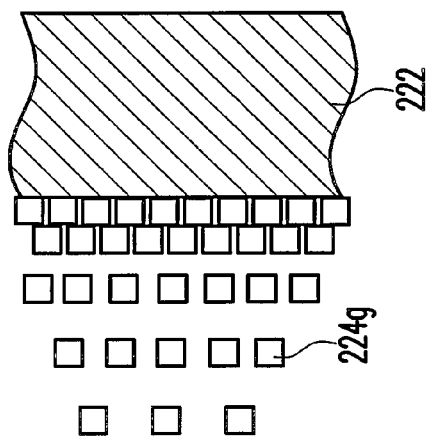
FIGS. 9A to 9C are schematic views of a part of the shielding pattern layer disposed in the peripheral region and the buffer pattern disposed in the buffer region in the color filter substrate of several embodiments of the present invention.
Figure 9A:
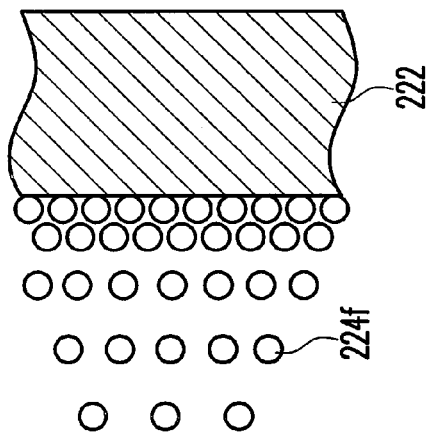
Figure 9C:
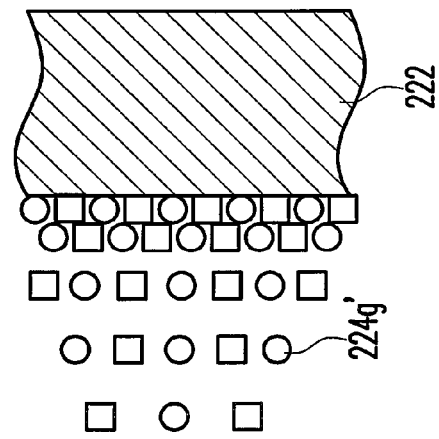

FIGS. 9A to 9C only show a part of the shielding frame 222 disposed in the peripheral region and the buffer patterns 224f, 224g, and 224g' disposed in the buffer region. The film layers, such as the color filter layer, the shielding pattern layer, the electrode layer, and the alignment material layer in the display region are the same as those of the first embodiment (as shown in FIG. 3), and the details will not be described herein again. First, referring to FIG. 9A, the buffer pattern comprises a plurality of patterns 224f, and the arrangement density of the patterns 224f is gradually reduced from the shielding frame 222 to the position away from the shielding frame 222. The material of the buffer patterns 224f can be the material of the color filter layer (red resin, green resin, or blue resin), or the material of the shielding pattern layer (black resin), or the material of the spacer (transparent resin). Definitely, the buffer patterns 224f can also comprises a plurality of materials, for example, a combination that a part of the patterns uses the material of the color filter layer, another part of the patterns uses the material of the shielding pattern layer, and the like.

The buffer patterns 224f as shown in FIG. 9A are, for example, round, but the shape of the alignment pattern is not limited in the present invention. The buffer patterns 224f can also be rectangular buffer patterns 224g (as shown in FIG. 9B) or the buffer patterns 224g' with a combination of various shapes (as shown in FIG. 9C). Definitely, the patterns can also be triangular and polygonal etc. No matter which shape the buffer pattern adopts, the buffer pattern of the present embodiment is defined based on the selection of the material while the shielding pattern layer 212 and/or the color filter layer 214 and/or the spacer are defined. Therefore, the method of the present invention only needs to change the mask design of the shielding pattern layer and/or the color filter layer and/or the spacer, and thus the complexity of the process is not increased.

In the present embodiment, the buffer patterns 224f, 224g or 224g' are constituted of a plurality of patterns, and the arrangement density of the patterns is gradually reduced from the shielding frame 222 to the position away from the shielding frame 222. Therefore, in the subsequent alignment rubbing process, when the rubbing roller contacts the buffer patterns 224f, 224g or 224g', the rubbing roller firstly contact the portion with loose distribution. Compared with the rubbing roller directly contacting the shielding pattern layer, the contact area is greatly reduced, thus the probability of generating memory trace caused by the direct contact between the rubbing roller and the shielding pattern layer can be reduced, thereby raising the yield of the alignment process. Further, the loose to dense design of the buffer patterns 224f, 224g or 224g' can help the rubbing roller to gradually fit the shielding frame 222.

Similarly, the buffer pattern of the present embodiment can also be disposed on one side edge of the peripheral region (as shown in FIG. 3), two side edges of the peripheral region (as shown in FIGS. 5A and 5B), or around the peripheral region (as shown in FIG. 6).

The Fourth Embodiment

Figure 10B:
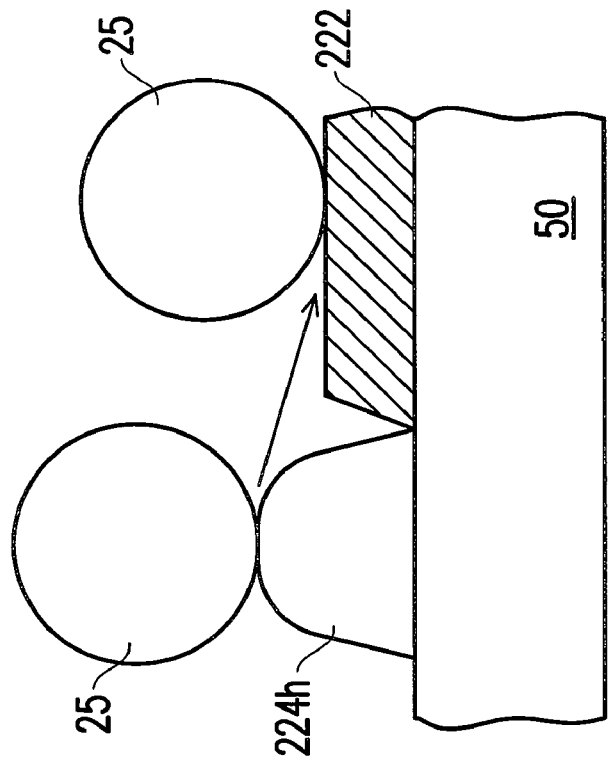
FIGS. 10A to 10B and FIGS. 11A to 11C are schematic views of a part of the shielding pattern layer disposed in the peripheral region and the buffer pattern disposed in the buffer region on the color filter substrate of several embodiments of the present invention.
Figure 10A:
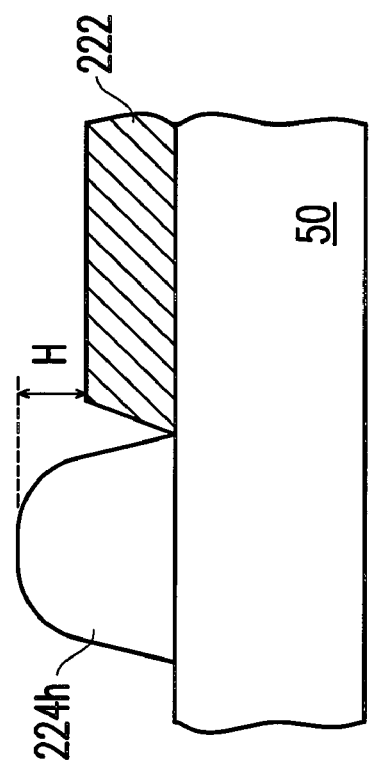

FIGS. 10A to 10B only show a part of the shielding frame layer 222 disposed in the, peripheral region and the buffer pattern 224h disposed in the buffer region. The film layers, such as the color filter layer, the shielding pattern layer, the electrode layer, and the alignment material layer in the display region are the same as those of the first embodiment (as shown in FIG. 3), and the details will not be described herein again. First, referring to FIG. 10A, in the embodiment, the thickness of the buffer pattern 224h formed in the buffer region is larger than the thickness of the shielding frame 222. For example, the thickness of the buffer pattern 224h is larger than the thickness of the shielding frame 222 H by about 1-2 μm. In a preferred embodiment, the material of the buffer pattern 224h is the same as the material of the spacer, for example, the transparent resin. Definitely, the material of the buffer pattern 224h is not limited in the present invention.

In the present embodiment, since the thickness of the buffer pattern 224h is larger than the thickness of the shielding frame 222, in the subsequent alignment rubbing process, as shown in FIG. 10B, the rubbing roller 25 first contacts the buffer pattern 224h, then directly rolls to the interior of the shielding frame 222, and does not contact the edge of the shielding frame 222. Therefore, the memory trace generated by the direct contact between the rubbing roller and the shielding pattern layer can be avoided, thereby raising the yield of the alignment process.

Figure 11A:
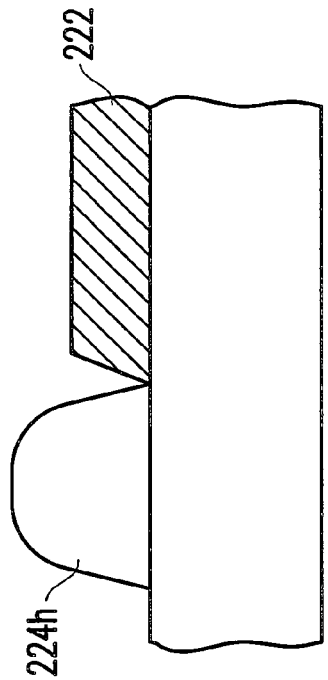
Figure 11B:
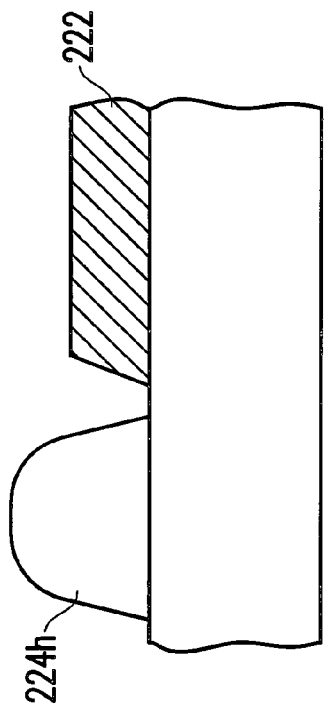
Figure 11C:
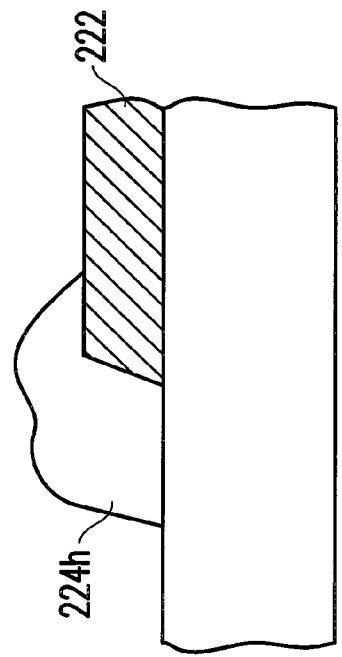

In the present embodiment, the relation between the buffer pattern 224h and the shielding frame 222 can be as follows. The buffer pattern 224h and the shielding frame 222 are not connected together (as shown in FIG. 11A), or the edge of the buffer pattern 224h and the edge of the shielding frame 222 are connected together (as shown in FIG. 11B), or the buffer pattern 224h covers a part of the shielding frame 222 (as shown in FIG. 11C).

Moreover, the buffer pattern 224h of the present embodiment can be constituted of a single continuous pattern, or can be constituted of a plurality of separate patterns. Similarly, the buffer pattern of the present embodiment may also be disposed on one side edge of the peripheral region (as shown in FIG. 3), two side edges of the peripheral region (as shown in FIG. 5A and FIG. 5B), or around the peripheral region (as shown in FIG. 6).

LCD Panel

Figure 12:
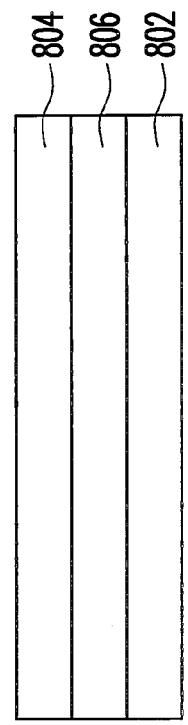
FIG. 12 is a schematic view of the liquid crystal display (LCD) panel of the present invention.

FIG. 12 is a schematic view of the LCD panel of the present invention. Referring to FIG. 12, the LCD panel comprises an active device array substrate 802, a color filter substrate 804 and a liquid crystal layer 806. The active device array substrate 802 and the color filter substrate 804 are assembled together, and the liquid crystal layer 806 is disposed between the active device array substrate 802 and the color filter substrate 804. The color filter substrate 804 of the LCD panel is the color filter substrate as described in any one of the embodiments. Thus, the color filter substrate 804 of the LCD panel can be prevented from being damaged in the rubbing process, and the display quality of the LCD panel can be improved.

To sum up, the color filter substrate and the fabricating method thereof of the present invention have at least the following advantages.

(1) In the present invention, various buffer patterns are formed on the edge of the shielding pattern layer, the surface of the rubbing roller can be protected from being damaged in the alignment rubbing process, thereby avoiding the abnormal recesses or groove marks on the alignment material layer during the alignment rubbing process.

(2) The present invention makes use of the buffer pattern to avoid the trace or damage to the surface of the rubbing roller due to the height fall of the shielding pattern layer, thereby prolonging the service life of the roller.

(3) The present invention has the design of buffer pattern without increasing the complexity of the process, so the yield of the color filter substrate can be increased. If it is applied to the color display, the display quality of the color display can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a color filter substrate, comprising:
providing a transparent substrate, the transparent substrate having a display region, a peripheral region and a buffer region;
forming a shielding pattern layer in the peripheral region on the transparent substrate;
forming a color filter layer in the display region; and
forming at least one buffer pattern in the buffer region, wherein the buffer pattern surrounds the display region, the material of the buffer pattern is selected from one of black resin, red resin, green resin, blue resin, transparent resin and the combination thereof, the buffer pattern comprises a plurality of patterns, and the arrangement density of the patterns is gradually reduced from the shielding pattern layer to the position away from the shielding pattern layer.

2. The method of claim 1, further comprising forming an alignment material layer at least covering a part of the color filter layer and shielding pattern layer; and performing an alignment rubbing process to the alignment material layer from the buffer pattern.

3. The method of claim 1, wherein the material of the buffer pattern is the same as the material of the shielding pattern layer, and the buffer pattern comprises a plurality of patterns arranged on the edge of the shielding pattern layer.

4. The method of claim 1, wherein the thickness of the buffer pattern is larger than or equal to the thickness of the shielding pattern layer.

5. The method of claim 4, wherein the height of the buffer pattern is larger than the height of the shielding pattern layer by 1-2 μm.

6. The method of claim 4, wherein the buffer pattern and the shielding pattern layer are not connected together.

7. The method of claim 4, wherein the edge of the buffer pattern and the edge of the shielding pattern layer are connected together.

8. The method of n claim 4, wherein the buffer pattern covers a part of the shielding pattern layer.

9. The method of claim 1, wherein the color filter layer is formed after or before the shielding pattern layer is formed.

10. The method of claim 9, further comprising forming a planarization layer to cover the shielding pattern layer and a color filter layer.

11. A color filter substrate, comprising:
a transparent substrate having a display region, a peripheral region and a buffer region;
a shielding pattern layer disposed in the peripheral region of the transparent substrate;
a color filter layer disposed in the display region; and
at least one buffer pattern disposed in the buffer region, wherein the buffer pattern surrounds the display region, the material of the buffer pattern is selected from one of black resin, red resin, green resin, blue resin, transparent resin and the combination thereof, the buffer pattern comprises a plurality of patterns, and the arrangement density of the patterns is gradually reduced from the shielding pattern layer to the position away from the shielding pattern layer.

12. The color filter substrate as claimed in claim 11, further comprising an alignment material layer at least covering a part of the color filter layer and shielding pattern layer.

13. The color filter substrate as claimed in claim 11, wherein the material of the buffer pattern is the same as the material of the shielding pattern layer, and the buffer pattern comprises a plurality of patterns arranged on the edge of the shielding pattern layer.

14. The color filter substrate as claimed in claim 11, wherein the thickness of the buffer pattern is larger than or equal to the thickness of the shielding pattern layer.

15. The color filter substrate as claimed in claim 14, wherein the thickness of the buffer pattern is larger than the thickness of the shielding pattern layer by 1-2 μm.

16. The color filter substrate as claimed in claim 14, wherein the buffer pattern and the shielding pattern layer are not connected together.

17. The color filter substrate as claimed inof claim 14, wherein the edge of the buffer pattern and the edge of the shielding pattern layer are connected together.

18. The color filter substrate as claimed in claim 14, wherein the buffer pattern covers a part of the shielding pattern layer.

* * * * *